United States Patent
Rakshit

(10) Patent No.: US 9,600,680 B2
(45) Date of Patent: Mar. 21, 2017

(54) UNMASKING OF CONFIDENTIAL CONTENT

(71) Applicant: INTERNATIONAL BUSINESS MACHINES CORPORATION, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/628,585

(22) Filed: Feb. 23, 2015

(65) Prior Publication Data

US 2016/0246979 A1    Aug. 25, 2016

(51) Int. Cl.
G06F 21/84    (2013.01)
G06F 21/62    (2013.01)
G06F 3/0488    (2013.01)

(52) U.S. Cl.
CPC ........ G06F 21/6218 (2013.01); G06F 3/0488 (2013.01); G06F 21/84 (2013.01)

(58) Field of Classification Search
CPC ..................................................... G06F 21/84
See application file for complete search history.

(56) References Cited

U.S. PATENT DOCUMENTS

| | | | |
|---|---|---|---|
| 7,191,338 B2 | 3/2007 | Stern et al. | |
| 7,502,831 B1 | 3/2009 | Macias et al. | |
| 7,779,475 B2 | 8/2010 | Jakobson et al. | |
| 8,026,930 B2 * | 9/2011 | Childress | G02B 27/2214 345/427 |
| 8,462,949 B2 | 6/2013 | Anderson et al. | |
| 2006/0074897 A1 | 4/2006 | Fergusson | |
| 2008/0025645 A1 * | 1/2008 | Jakobson | G06F 21/62 382/300 |

(Continued)

FOREIGN PATENT DOCUMENTS

EP    2733578 A2    5/2014

OTHER PUBLICATIONS

Galloway, "Hack an Old LCD Monitor Into a Polarized Privacy Monitor", http://lifehacker.com/5862795/hack-an-old-lcd-monitor-into-a-polarized-privacy-monitor, Nov. 2014, 4 pages.

(Continued)

*Primary Examiner* — Jason C Chiang
(74) *Attorney, Agent, or Firm* — Ronald A. Kaschak; Matthew M. Hulihan; Heslin Rothenberg Farley & Mesiti

(57) ABSTRACT

Facilities are provided herein for unmasking content presented on a display of a computing device. An unmask rule for unmasking the content on the display is determined based on confidentiality level of the content and includes an unmasking parameter indicating an extent to which a masked version of the content is to be physically shielded to unmask the content. A mask is selected and applied to the content in displaying the content on the display. The mask is selected based on the determined unmask rule to convey the unmasking parameter to a user. A shielding level indicating an extent to which the user has physically shielded the masked content on the display is detected and it is determined whether the detected shielding level satisfies the unmasking parameter. If so, the content is temporarily unmasked on the display.

19 Claims, 8 Drawing Sheets

(56) References Cited

U.S. PATENT DOCUMENTS

| | | | |
|---|---|---|---|
| 2009/0141895 A1* | 6/2009 | Anderson | G06F 21/84 380/252 |
| 2010/0130280 A1* | 5/2010 | Arezina | G07F 17/3206 463/20 |
| 2011/0316997 A1* | 12/2011 | Shirbabadi | G07F 19/201 348/78 |
| 2012/0287056 A1 | 11/2012 | Ibdah | |
| 2013/0021240 A1* | 1/2013 | Coulon | G06F 21/6245 345/156 |
| 2013/0285922 A1* | 10/2013 | Alberth, Jr. | G06F 1/1694 345/173 |
| 2014/0150114 A1* | 5/2014 | Sinha | H04W 12/00 726/28 |
| 2014/0176562 A1* | 6/2014 | Somerfield | G06T 11/00 345/443 |
| 2014/0253412 A1 | 9/2014 | Blaich et al. | |
| 2015/0101066 A1* | 4/2015 | Fram | G06F 19/321 726/28 |

OTHER PUBLICATIONS

Bill, "Mobile Survey: 77 Percent Exposure of Confidential Data", Feb. 16, 2014, http://www.oculislabs.com/office/mobile-worker-privacy-survey-finds-77-percent-exposure-of-confidential-data/, Feb. 2014, 5 pages.

Open Discussion Forum, Jun. 28, 2014, http://sourceforge.net/p/keepass/discussion/329220/thread/84111732/?limit=25, 3 pages.

SplashID Safe User Guide, http://www.splashdata.com/splashid/userguide/android/, Oct. 2014, 7 pages.

"MAGEN—The Big Cover-Up", http://researchweb.watson.ibm.com/haifa/info/200904_MAGEN.shtml, Oct. 2014, 2 pages.

Cooney, "IBM Security Software Masks Confidential Info", Jul. 9, 2009, http://www.cio.com/article/2426509/it-organization/ibm-security-software-masks-confidential-info.html?null, 2 pages.

* cited by examiner

UNMASKING OF CONFIDENTIAL CONTENT

BACKGROUND

When a user views sensitive information on a display of a computing device it can be difficult to ensure that the information is not also visible to others who may be in the area around the display. A common such situation is when the user is in a public space, such as a subway, where the user may be very close to other individuals. The screen of the user's smartphone or other mobile device will generally be visible to a much larger viewing angle than that of the user, thus exposing the content on the screen to view by others. This presents difficulties to a user who desires to view sensitive content on the display while in the presence of others. Content can include anything for display on the device, such as images, videos, alphanumeric text, or anything else that is viewable on the screen. Existing facilities to add protection to confidential information may involve use of polarizing privacy screens, provision of a password to reveal the content on the screen, selection of a checkbox to reveal the content, or merely touching the screen, as examples, but do not adequately provide a facility to ensure that confidential content is being shielded in order to be viewable on the display.

BRIEF SUMMARY

Shortcomings of the prior art are overcome and additional advantages are provided through the provision of a method that includes determining an unmask rule for unmasking content on a display of a computing device, the unmask rule including an unmasking parameter indicating an extent to which a masked version of the content on the display is to be physically shielded to unmask the content for viewing on the display, and the determining the unmask rule being based at least in part on a confidentiality level associated with the content; displaying the masked version of the content on the display, the displaying including selecting and applying a mask to the content in displaying the content on the display, wherein the mask is selected based on the determined unmask rule to convey the unmasking parameter to a user; detecting, by a processor of the computing device, a shielding level indicating an extent to which the user has physically shielded the masked version of the content on the display; determining whether the detected shielding level satisfies the unmasking parameter; and temporarily unmasking the content on the display of the computing device based on determining that the shielding level satisfies the unmasking parameter.

Further, a computer program product including a computer readable storage medium readable by a processor and storing instructions for execution by the processor is provided for performing a method that includes: determining an unmask rule for unmasking content on a display of a computing device, the unmask rule including an unmasking parameter indicating an extent to which a masked version of the content on the display is to be physically shielded to unmask the content for viewing on the display, and the determining the unmask rule being based at least in part on a confidentiality level associated with the content; displaying the masked version of the content on the display, the displaying including selecting and applying a mask to the content in displaying the content on the display, wherein the mask is selected based on the determined unmask rule to convey the unmasking parameter to a user; detecting a shielding level indicating an extent to which the user has physically shielded the masked version of the content on the display; determining whether the detected shielding level satisfies the unmasking parameter; and temporarily unmasking the content on the display of the computing device based on determining that the shielding level satisfies the unmasking parameter.

Yet further, a computer system is provided that includes a memory and a processor in communications with the memory, wherein the computer system is configured to perform a method including: determining an unmask rule for unmasking content on a display of a computing device, the unmask rule including an unmasking parameter indicating an extent to which a masked version of the content on the display is to be physically shielded to unmask the content for viewing on the display, and the determining the unmask rule being based at least in part on a confidentiality level associated with the content; displaying the masked version of the content on the display, the displaying including selecting and applying a mask to the content in displaying the content on the display, wherein the mask is selected based on the determined unmask rule to convey the unmasking parameter to a user; detecting a shielding level indicating an extent to which the user has physically shielded the masked version of the content on the display; determining whether the detected shielding level satisfies the unmasking parameter; and temporarily unmasking the content on the display of the computing device based on determining that the shielding level satisfies the unmasking parameter.

Additional features and advantages are realized through the concepts of aspects of the present invention. Other embodiments and aspects of the invention are described in detail herein and are considered a part of the claimed invention.

For instance, detecting the shielding level includes determining an area of the screen being hidden by the user, and determining whether the detected shielding level satisfies the unmasking parameter includes determining whether the area of the screen being hidden by the user satisfies the unmasking parameter. Determining the area of the screen being hidden by the user may include ascertaining, based on one or more illumination levels indicated by one or more illumination detectors of the computing device, an extent to which external light is being blocked by the user.

The unmasking parameter may include one or more predefined touch-area profiles, where determining the area of the screen being hidden by the user includes determining a touch-area, on the display, being touched by the user, the touch-area comprising one or more touch points, and the touch-area being determined by identifying and stitching together the touch points to identify the touch-area, where determining whether the detected shielding level satisfies the unmasking parameter includes determining that the touch-area sufficiently matches a predefined touch-area profile of the one or more predefined touch-area profiles.

Further, a method can include detecting, using a camera of the computing device, one or more sight angles of one or more individuals, other than the user, within eyesight of the masked version of the content on the display, where detecting the shielding level includes detecting an extent to which the user has physically shielded the masked version of the content from viewing from the one or more sight angles, and where determining whether the detected shielding level satisfies the unmasking parameter includes determining that the masked version of the content is sufficiently shielded from viewing from the one or more sight angles.

Additionally, the mask may be selected from a plurality of masks that vary from each other by at least one visual mask characteristic, where variance among the plurality of masks by the at least one visual mask characteristic indicates variance between the plurality of masks in the extent to which content being masked is to be physically shielded to unmask the content. The at least one visual mask characteristic may include one or more of the following: shading, color, shape, pattern, size, or animation of the mask.

Determining the unmask rule may be further based on a current context in which the computing device is being used. The current context may include one or more of: (i) a current location of the computing device, (ii) a current time, or (iii) a current day.

Additionally or alternatively, the current context may include one or more environmental parameters of an environment in which the computing device is being used, the one or more environmental parameters including one or more of: (i) detected sound, (ii) detected nearby devices, or (iii) detected ambient lighting around the computing device.

Additionally or alternatively, the current context may include physical proximity of the computing device to individuals other than the user of the computing device, the physical proximity detected using one or more cameras of the computing device, where the extent to which the masked version of the content on the display is to be physically shielded to unmask the content is directly proportional to one or more of the following: (i) proximity of the computing device to individuals other than the user, or (ii) a number of individuals, other than the user, within eyesight of the masked version of the content on the display, as detected by the one or more cameras.

Determining the unmask rule may be based further on one or more of the following: metadata associated with the content, in which the metadata specifies a desired extent to which the masked version of the content is to be physically shielded to unmask the content for viewing; or one or more rules preconfigured by the user indicating a desired extent to which masked versions of content of a given type are to be physically shielded to unmask content of the given type for viewing.

Further, a method may include determining the confidentiality level associated with the content based on at least one of the following: (i) metadata associated with the content and indicating the confidentiality level, (ii) a rule preconfigured by a provider of the content indicative of the confidentiality level for the content, (iii) a rule preconfigured by a recipient of the content indicative of the confidentiality level for content of a same type as a type of the content for presentation on the display, or (iv) an analysis of the content for presentation on the display and a determination based thereon of the confidentiality level; and determining the unmask rule based on the determined confidentiality level.

Yet further, a method may include, based on unmasking the content, repeating, while the content is unmasked, detecting the shielding level and determining whether the detected shielding level satisfies the unmasking parameter; and based on determining that the detected shielding level no longer satisfies the unmasking parameter, reapplying the mask to the content on the display.

Advantageously, confidential content may be hidden whenever no, or an insufficiently level of, shielding is provided, while, at the same time, a user may be able to view the content provided that the user physically hides the content to some desired extent. The masking provides heightened security while still enabling the user to view the confidential content while in public places, crowded areas, or other contexts where others may be within sight of the user's screen. Additionally, differing levels of confidentiality may require differing extents of physical shielding, which provides a flexible approach that balances sensitivity of the information with the inconvenience imposed on the user to shield the content in order to view it. Further advantages provide for accounting for the context in which the device is being used and providing dynamic guidance on the proper shielding needed to unmask the content. Additionally, definition of profiles (touch-point contours and illumination/proximity levels) that suffice for unmasking serve a purpose of ensuring that proper shielding of the masked area takes place. Further, putting a temporal component on the unmasking that accounts for physical shielding protects the content from third-party view better than other approaches in which the user enters a password or selects an option (checkbox) to unmask content, which do not account for whether or not the unmasked content remains hidden from others' view.

BRIEF DESCRIPTION OF THE DRAWINGS

Aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
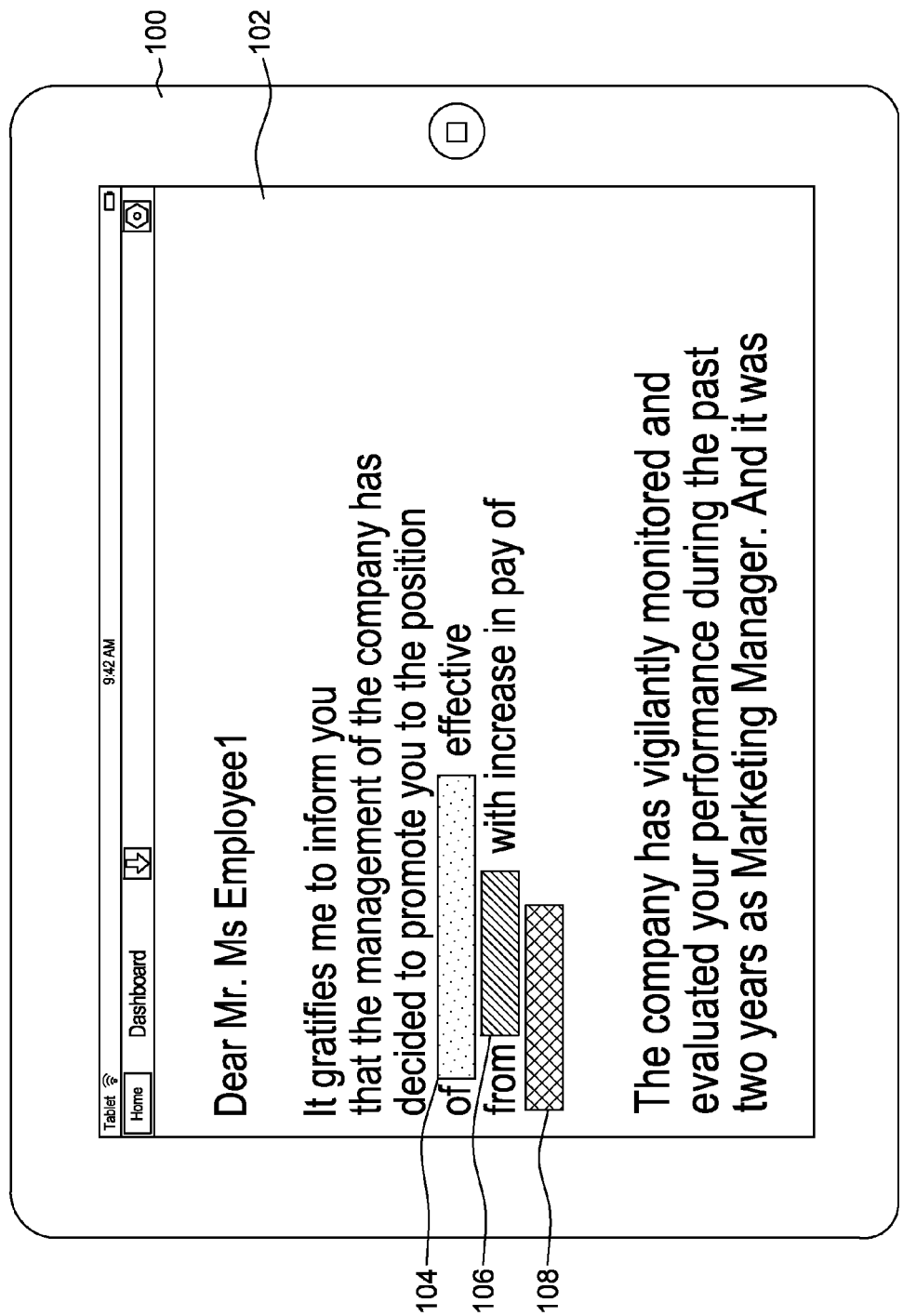
FIG. 1 depicts an example computing device having a display presenting a masked version of content thereon, in accordance with aspects described herein.

Described herein are facilities that provide for unmasking content on a display of a computing device. A mask to apply to confidential content for display on the computing device may be selected based on an unmask rule for unmasking the content on the display. The unmask rule may reflect an extent to which a masked version of the content on the display is to be physically shielded in order to unmask the content. This may be based on a confidentiality level attributed to the content. In this regard, more confidential, i.e. sensitive, content may require more aggressive physical shielding by the user in order to unmask the content on the screen.

The unmask rule and the extent to which the user is to physically shield the masked version of the content may statically defined. Alternatively, various parameters, including confidentiality level of the content, can control the unmask rule, and therefore the extent to which the content is to be physically shielded for unmasking the content. In some examples, the unmask rule is dynamically determined based not only on confidentiality level of the content but also on a current context in which the computing device is being used, for instance the location of the device or the current time of day.

When the unmask rule is determined, a mask may be selected that provides an indication to the user as to how aggressively the masked content should be shielded in order for it to be unmasked. The indication may be provided by selecting characteristics of the mask, such as its shade, that convey to the user the extent of physical shielding needed.

Based on the user sufficiently physically shielding the masked version of the content, the computing device may unmask the content. An example of a user physical shielding masked content is when the user cups his/her hand and places it against the display to at least partially surround the masked content, while the masked content is still visible to the user. The computing device may detect, as described herein, that the masked content has been physically shielded and may unmask the content. Detection of the physical shielding level can be determined using sensors and/or other components of the computing device, such as touch sensors and illumination level detection sensors of the computing device. The device may take input from such sensors or other components to detect a shielding level indicating the extent to which the user has shielded the masked content. This can be compared to the unmasking parameter indicating the desired extent of physically shielding needed to unmask the content. Additional enhancements are possible. For instance, camera(s) of the computing devices can detect faces and sight angles of nearby individuals within eyesight of the masked content. The unmask rule may be built to require that the user physically shield the content from viewing from those sight angles. The computing device may provide indicators to the user to assist the user in adequately shielding the content. In some examples, the applied mask may be dynamic and indicate the direction(s) from which physical blocking should occur, based on the detected sight angles of the nearby individuals.

As described herein, facilitates are provided for securely displaying electronic content on a display of a computing device. The computing device unmasks the content based on a user physically shielding a masked version of the content on the display. The computing device initially displays a hidden (masked) version of the content but will temporarily unmask the content, provided that the computing device detects that a level of physical shielding of the content appropriate for the circumstances (confidentiality and usage context) has been applied. Less confidential content, and/or contexts in which the content is less vulnerable to third-party viewing, may warrant a more casual, less aggressive extent of physical shielding, while more confidential content, and/or contexts in which the content is more vulnerable to third-party viewing (e.g. public spaces), may warrant a more aggressive extent of physical shielding, such as a closed hand surrounding the masked content. To sense an extent to which a user has physically shielded the content, a touch-points contour(s) and illumination level detection can be used to determine how well-shielded the masked content is.

FIG. 1 depicts an example computing device having a display presenting a masked version of content thereon, in accordance with aspects described herein. Computing device 100 in FIG. 1 is a mobile computing device, and more specifically a tablet computer, having a display 102 on which content is presented to a user. Some content is presented in plaintext, while other content is presented in masked form. Specifically, masks 104, 106, and 108 are applied to mask certain content on the display. In FIG. 1, the content presented is a document informing the recipient-user of a job promotion. Mask 104 masks content indicating a new position to which the recipient has been promoted. Mask 106 masks content indicating an effective date (start date) for the position, and mask 108 masks content indicating the increase in salary associated with the promotion. These three pieces of information are masked because they are deemed at least somewhat confidential. It is seen that the masks applied incorporate different patterns. Mask 106 (for effective date) has a first pattern, mask 104 (for new position) has a second pattern, and mask 108 (for salary increase) has a third pattern. The single cross-hatched pattern (106) can indicate lower confidentiality, while the stipple pattern (104) indicates relatively moderate confidentiality, and the double cross-hatched pattern (108) indicates relatively high confidentiality. This visual mask characteristic—patterning in this example—is dependent on the degree of confidentiality attributed to each piece of information. The salary increase is more confidential than the new position and the effective date. While all three pieces of content are masked sufficiently enough to prevent any viewing of the content in their masked form, the patterning conveys to the user an extent to which the masked content is to be physical shielded to unmask the content. The salary information, for instance, requires a more aggressive level of shielding than does the effective date or new position. This is conveyed to the user in order to give the user an idea about how aggressively he/she is to shield the content.

The confidentiality level associated with content may be indicative of the sensitivity of the content itself and/or how that content is being conveyed. A credit card number, for instance, may be universally regarded as being of relatively high sensitivity. Content that may be conveyed with reference to other information may be of varying sensitivity, depending on how that content is being conveyed. For instance, when presenting a salary increase, it could be conveyed as a percentage of existing salary (e.g. 30%) or as an absolute value (e.g. $30,000), as examples. Expression of the content (salary increase) as a percentage may be less sensitive content than the absolute value because it requires additional knowledge, namely existing salary, to understand fully.

Various approaches are available to determine the level of confidentiality of content. In some examples, metadata is associated with the content, for instance is associated with the file (document, image, video, database, etc) containing the content. The metadata can indicate which content is deemed confidential and how confidential that content is. Further, rules may be preconfigured to indicate the confidentiality level of content. For instance, a provider of the content can indicate that content of a particular type should be marked with a specified level of confidentiality, and/or the recipient of the content can preconfigure rules to specify the confidentiality level for content of a particular type.

Additionally or alternatively, automated analysis of the content may be performed to determine the confidentiality level associated with the content, absent any need for the sender or recipient to specify the confidentiality level or preconfigure rules. In some examples, the content is parsed and an engine automatically determines and optionally tags content with a confidentiality level thereof.

The confidentiality level of content may be used to determine an unmask rule for unmasking the content. The unmask rule can include an unmasking parameter that indicates the extent to which the masked version of the content on the display is to be physically shielded to unmask the content for viewing. Generally, the more confidential the content, the more aggressive the level of physical shielding must be to unmask the content.

Different contexts under which the device is being used, referred to herein as current usage context, may also factor into the unmask rule for unmasking the content. If the computing device determines that the user (and therefore the device that the user is using) is currently at home, for instance, then it may not be a problem to show even highly confidential information with relatively little or no physical shielding. In this case, based on the location of the user at that time (e.g. home), the unmask parameter may indicate a relatively small extent of shielding is needed. If instead the user is detected to be in a public space, such as on a public subway, then a relatively aggressive level of shielding may be needed to unmask that same highly confidential information. In another example, if the current time of day is during normal working hours for the user, in which he/she is likely to be near coworkers, the unmask rule may have an unmasking parameter that requires more aggressive shielding to unmask the content than if current time of day were outside of working hours, when the user is unlikely to be near coworkers.

As noted, the current usage context refers to the context under which the device is currently being used. Context may be determined from one or more device usage parameters, examples of which include the time (clock time, day, week, month, year, time of year, etc.), location (physical, GPS location), location-type (home, work, etc), connection status of the device (such as a current network connection to a trusted network, presence of nearby devices), or any other parameter describing a context under which the device is currently operating. Example environmental parameters include detected sound, detected nearby/network devices (based on network, near-field, Bluetooth, or other connection, for instance), detected faces near the device, and detected ambient lighting around the computing device. These parameters may reflect how likely or unlikely it is that the content may be viewed by a nearby third party. Further examples are now provided to illustrate how current usage context may inform the unmask parameter:

Day of week: A weekend day may suggest that the user is unlikely to be near coworkers, therefore the required level of shielding of information that is sensitive with respect to coworkers may be lower Presence of other devices on a network to which the computing device is presently connected: If other devices known to be those that the user has at home are detected, the required level of shielding of information that is sensitive may be lower; if other, unknown, devices are detected, the user may be assumed to be connected to a public network in a public location, therefore the required level of shielding of information that is sensitive may be higher Physical presence of others: If a proximity sensor detects close proximity of others, or a minimum number of others within eyesight of display, the required level of shielding of information that is sensitive may be higher Physical presence of others: As described above, camera(s) of the computing devices can detect faces and sight angles of nearby individuals within eyesight of the masked content. If a minimum number of faces are detected, the required level of shielding of information that is sensitive may be higher Detected sound: If silence is detected, it may be assumed that the user is alone and therefore the required level of shielding of information that is sensitive may be lower; if several different voices are detected by the computing device, it may be assumed that the user is not alone and therefore the required level of shielding of information that is sensitive may be higher Detected ambient lighting around the computing device: If the ambient lighting is very high, it may be assumed that the user is outdoors in a public space and therefore likely to be near others, therefore the required level of shielding of information that is sensitive may be higher Current usage context of the device can be determined using existing facilities of computing devices, for instance input from sensors and/or other components of the device. Microphones, proximity sensors, light sensors, accelerometers, GPS devices, and cameras are just examples of devices that can provide input to the determination of current usage context. Other information, such as that provided by the operating system or otherwise, for instance current time/date or network connection information, can also be used.

Current usage context can inform the device of an appropriate relative level of shielding required in order to unmask content on the device. Even extremely confidential information may be unmasked with relatively little physical shielding, depending on whether the usage context is being taken into account and, if so, what the current usage context is.

The unmask rule, by way of the unmasking parameter, provides an indication of the extent of physical shielding required to unmask the content. As described above, this may be based on a current usage context. Additionally or alternatively, it may be based on other factors such as metadata associated with the content that specifies the extent of physical shielding needed under one or more contexts. Similarly, unmask rule(s) may be preconfigured by the user (content provider or viewing user) indicating how unmasking of content of a given type is to be handled. A rule may specify a desired extent to which masked versions of content of the given type are to be physically shielded to unmask content of the given type for viewing. The rules can set parameters under which the unmasking parameter is to be set to a given level. The parameters may be in terms of information accessible to the device, such as input from sensors of the device. If desired, preconfigured rules may shared with individuals, such as family or friends, in advance or along with the content to assist in the determination of the unmask rule.

By way of specific example, a recipient can specify a rule that says that when the user is using the device at home, low shielding is needed for low-to-moderately confidential content, but aggressive shielding is needed for highly confidential content. As another example, a rule could specify that when the current day is Monday through Friday and the time is between 8:00 AM and 6:00 PM, content that is received though a work email account and analyzed to be work-related is to be shielded at a moderate to high level depending on the confidentiality level of the content.

After determining the unmask rule for unmasking the content, and based on the determined unmask rule, a mask may be selected and applied to the content in displaying the content on the display for the user. Selection of the mask includes application of visual mask characteristic(s) that help inform the user of the confidentiality level of the content and the extent to which the content being masked is to be physically shielded to unmask the content. Since different levels of shielding may be needed, it may be useful to convey to the user how aggressive the shielding needs to be. The example of FIG. 1 uses different patterning of the mask as the visual mask characteristic. Other characteristics may be applied, for instance shading, wherein a lighter shade corresponds to less confidential information and therefore a lesser extent of shielding needed. Yet other visual characteristics of the masks may be varied, for instance color, shape, sizing, or animation of the masks. Additionally or alternatively, text applied to the mask may vary to indicate the unmasking parameter to user.

Figure 2:
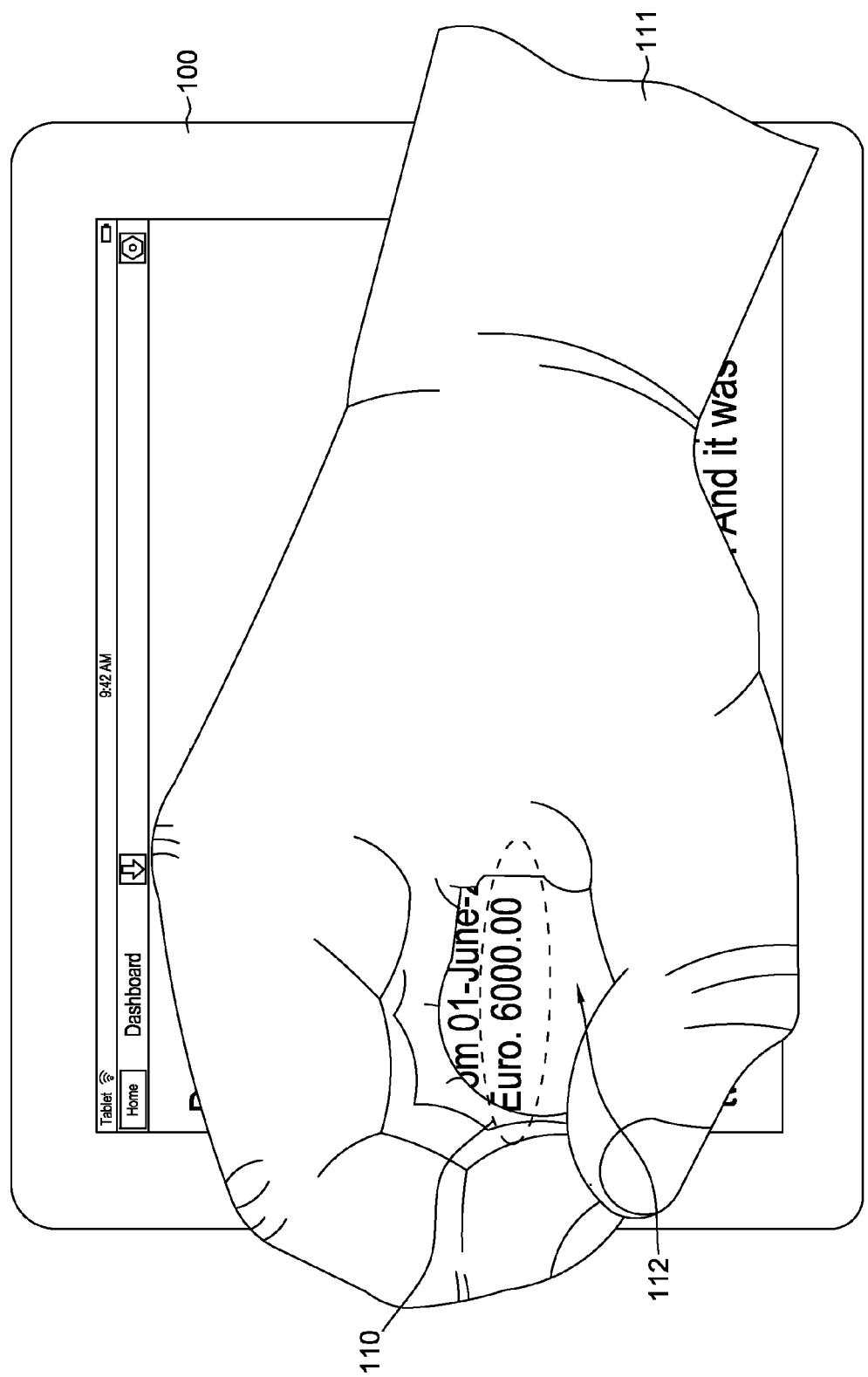
FIG. 2 depicts an example in which content on a display has been unmasked based on a user physically shielding a masked version of content displayed on the display, in accordance with aspects described herein.

After the masked version of the content is displayed, the user can unmask the content by physically shielding the content to the extent appropriate. FIG. 2 depicts an example in which content on a display has been unmasked based on a user physically shielding a masked version of the content displayed on the display, in accordance with aspects described herein. In FIG. 2, tablet computer 100 (of FIG. 1) has displayed thereon content 110 that has been unmasked. Here, the content is the salary increase and reads "Euro. 6000.00". This content was initially masked by mask 108 (FIG. 1), but the user has physically shielded the masked version of this content to unmask the content. In this example, the user has physically shielded the masked content using his hand 111 but other examples may enable a user to use an object, such as a newspaper, to physically shield the content.

More specifically, the user in this example has cupped his right hand by placing his thumb to his fingertips and has placed his cupped hand against the display (which is a touch-screen in this example) to surround the content masked by 108. The cupped hand forms a hole 112 through which the user can view the unmasked content, but which prevents others having a different line of sight from viewing. The computing device detects the extent to which the user has physically shielded the masked version of the content using one or more sensors, as described in further detail below with reference to FIG. 3.

The unmasking of the content 110 may be temporary. For instance, the computing device may reapply the mask when it is detected that the appropriate level of physical shielding of the content has been removed. This may occur based on the user removing his hand, for instance. In other examples, the unmask rule defines a duration of time (e.g. number of seconds) that the content will be unmasked before the mask is automatically reapplied, regardless of whether the content remains physically shielded. In this regard, the unmake rule can incorporate temporal element(s) specifying details of whether/when to reapply the mask.

Figure 3:
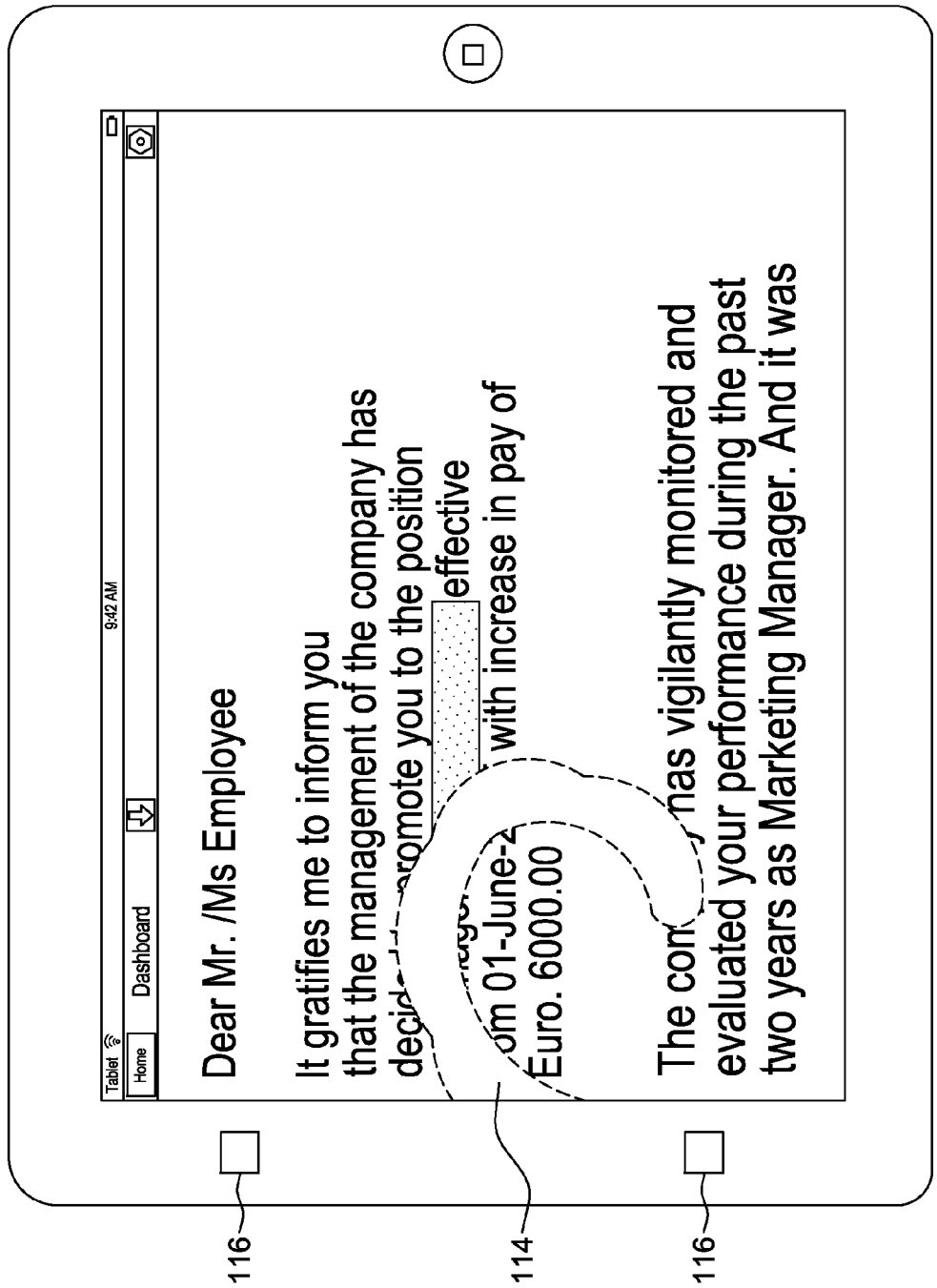
FIG. 3 depicts an example touch-area of a display representing an area touched by a user when physically shielding a masked version of content, in accordance with aspects described herein.

FIG. 3 depicts an example touch-area of a display representing an area touched by a user when physically shielding a masked version of content, in accordance with aspects described herein. The touch-area corresponds to an area of the display that the touch-sensors of the display detect are being touched by the user. The touch-area detected in FIG. 3 is indicated by area 114, and represents the area that the side of the user's hand touches when the user places his hand against the screen as shown in FIG. 2. Also noteworthy is the fact that in this position the user's hand stands against the screen extending away from the screen toward the user (by a distance equal to the width of the user's hand) to create a wall surrounding the masked content. In this example, the touch-area mostly surrounds the masked content and is masked by the user's hand, which extends at least several inches off of the screen to create a relatively high level of shielding.

The extent to which the masked content is physically shielded is determined based, at least in part, on this determined touch-area. It may also be based on illumination and/or proximity levels detected by sensors 116. A sensor 116 can detect intensity/illumination of surrounding lighting and can ascertain directions from which light may be blocked. Additionally or alternatively, a sensor 116 can detect proximity of objects (e.g. a hand, individual faces) and factor that into the determination of the level of physical shielding being applied. By checking whether, and to what extent, external light is being hidden or blocked and proximity of other objects, together with the determined touch-area, processing within the computing device can check the extent to which the content is being physically shielded.

Figure 4B:
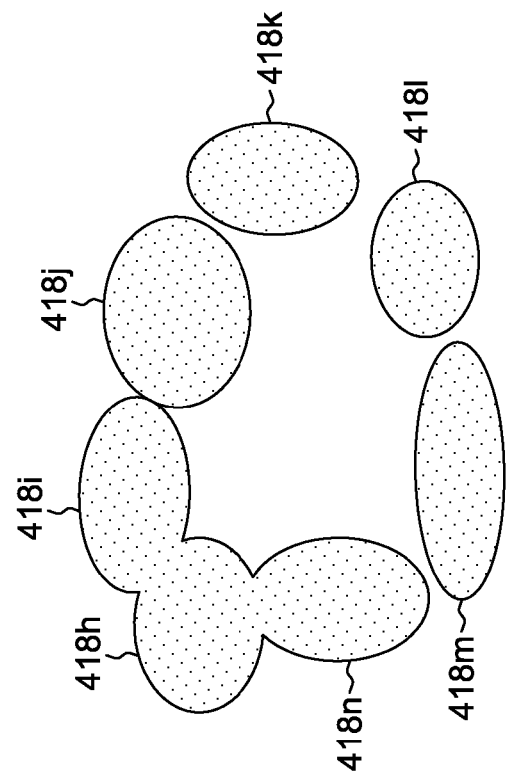
FIGS. 4A and 4B depict examples of touch-point patterns that may be stitched together to determine a touch-area, in accordance with aspects described herein.
Figure 4A:
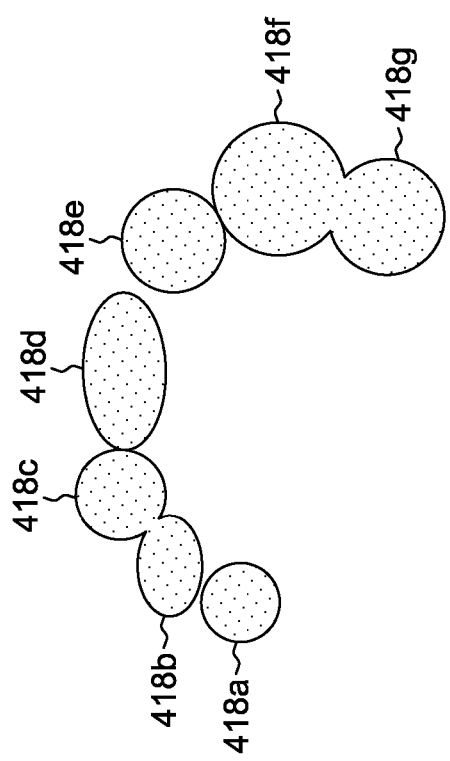

The touch-area may be determined based on identifying and stitching together touch-points that form a pattern or path indicating the area(s) touched. FIGS. 4A and 4B depict example touch-point patterns that may be stitched together to determine a touch-area, in accordance with aspects described herein. In FIG. 4A, the computing device may detect touches at each of touch-points 418a-418g. The touch-pints may be the particular locations that the user has touched to a minimal extent needed to register a full touch. Analysis of these detected touch points may reveal a pattern generally representing an arc that is not closed. The touch-points can be stitched together to identify the touch-area—or area being touched (or nearly touched) by the user. The positioning of this arc to partially-surround masked content may provide the desired level of shielding to unmask the content. FIG. 4B presents a pattern of touch-points 418h-418n that, when stitched together, define a touch-area that is fully enclosed. This level of closure may be necessary to unmask content that is deemed highly confidential.

Identification and stitching-together of touch-points may be performed using any of various techniques in which software detects touch-points and then analyzes their positioning to find consecutive touch-points that define a profile. For instance, the system can use interpolation to form a smoother, stitched-together profile for the touch-area based on the touch-points. The identified profile can be compared to predefined touch-area profiles. These predefined profiles may be predefined as part of the unmask rule or unmasking parameter of the unmask rule for unmasking the content. If there is a sufficient match between the determined touch-area and one (or more) of the predefined profiles, the content may be unmasked.

The profiles may vary according to which hand the user uses to perform the physical shielding. In this regard, the computing device may be configured to handle the possibility where the user physically shields content using his right hand, left hand, or either hand. In some examples, the computing device indicates to the user which hand is to be used. In other examples, the user selects which hand the user will use and the computing device evaluates the touch-areas accordingly. In yet other examples, the computing device does not know in advance which hand the user will use.

Camera(s) of the computing devices may also provide a dynamic element to the extent of shielding needed to unmask the content. Cameras and associated processing may detect faces (and therefore sight angles) of nearby individuals within eyesight of the masked content, which can dictate directions from which the user's blocking should occur. The unmasking parameter can account for this and require that the user sufficiently shield the sight-paths of those individuals.

In specific examples, the display of the computing device comprises a touch screen having multi-touch sensor(s), and the device further includes illumination level detection sensor(s). Together, the sensors can determine an extent to which the user is physically shielding content on the display. Rules or other indicators can be used to define a level of confidentiality associated with content. Based on that, and perhaps additional information, such as context under which the device is being used, a mask may be selected and applied when the content is displayed on the screen. Thus, what is displayed initially is a masked version of that content. If a user desires to unmask the masked content, then the user hides (physically shields) the content with his hand or other object(s). Sensors installed in the computing device can determine a touch-area profile, including whether of not the touch-area partially or fully surrounds the masked content. An unmask rule may dictate that, for instance, content of the highest degree of confidentiality requires a profile that encloses the content, whereas content of lesser degrees of confidentiality require profiles providing only partial enclosure of the content. Additionally, users can provide different predefined rules for confidential content unmasking. Example such rules include:

If the user is at home, then no masking is applied in the first place, or very minimal shielding is required;

If the user is at his work office or other place away from home, then confidential information can be unmasked only with a closed touch-area profile; or Unmasking should account for environmental parameters like external sound, nearby mobile devices, presence of other individuals (identified by the camera), and so on Illumination and/or proximity detectors can check an extent to which ambient or external light is restricted and/or proximity of objects, such as a user's hand, to the masked content. This information can augment the determined touch-area profile for an overall determination of the extent to which the masked content is hidden. Software can validate that the detected extent (restricted external light, touch-area profile) matches, or is within some threshold of, a desired extent. If so, the software can unmask the content to enable the user to view the content.

Advantageously, confidential content may be hidden whenever no, or an insufficiently level of, shielding is provided. At the same time, a user is able to view the content, provided that the user physically hides the content to some desired extent. The masking provides heightened security while still enabling the user to view the confidential content while in public places, crowded areas, or other contexts where others may be within sight of the user's screen. Additionally, differing levels of confidentiality may require differing extents of physical shielding. This provides a flexible approach that balances sensitivity of the information with the inconvenience imposed on the user to shield the content in order to view it. Further advantages provide for accounting for the context in which the device is being used. The device can dynamically determine, based on detected faces, a desired direction of blocking required to effectively shield the content from view by others. The device can indicate this to the user, providing him/her guidance on the proper hand to use to perform the blocking. Additionally, definition of profiles (touch-point contours and illumination/proximity levels) that suffice for unmasking serve the purpose of ensuring that proper shielding of the masked area takes place. Further, putting a temporal component on the unmasking that accounts for physical shielding protects the content from third-party view better than other approaches in which the user enters a password or selects an option (checkbox) to unmask content, which do not account for whether or not the unmasked content remains hidden from others' view.

Improvement in functioning of computing devices is provided herein. As an example, improvement in how confidential digital content is presented to a user on a display and viewed by the user in a secure manner on the display of the computing device is provided by was processing described herein.

Figure 5A:
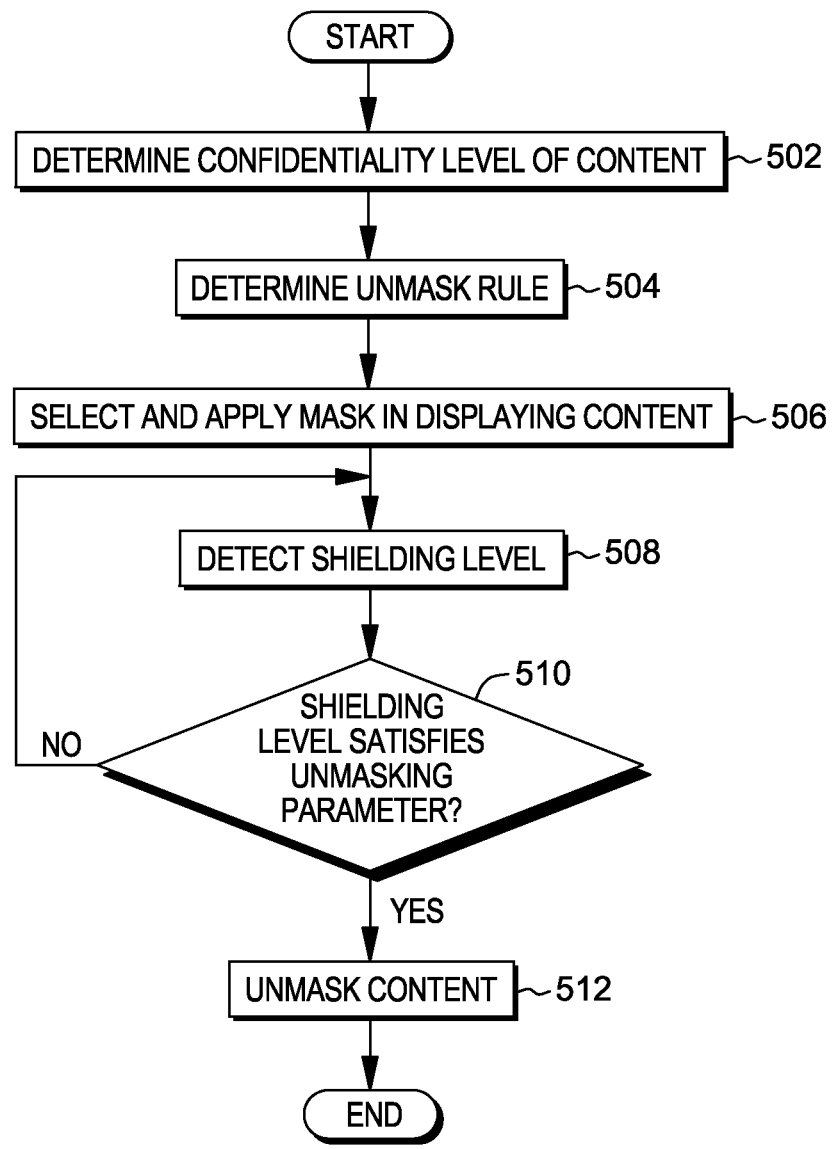
FIGS. 5A and 5B depict example processing performed by a computing device in unmasking confidential content, in accordance with aspects described herein.
Figure 5B:
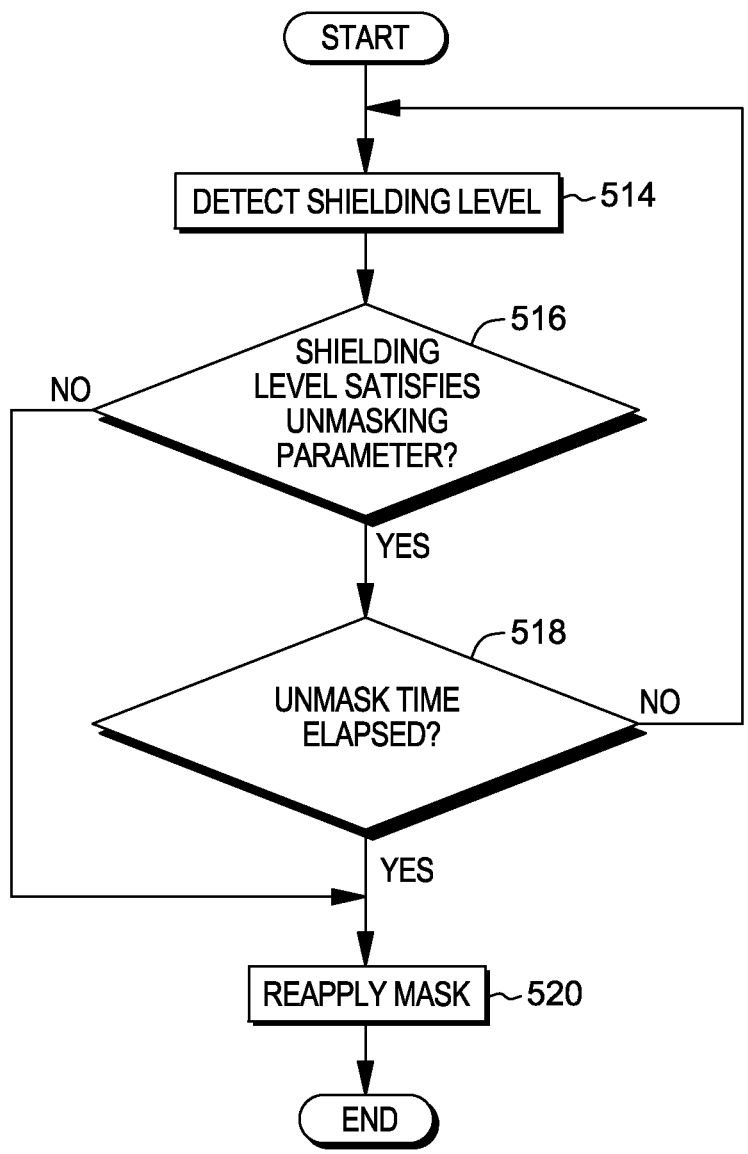

FIGS. 5A and 5B depict example processing performed by a computing device in unmasking confidential content, in accordance with aspects described herein. The process begins by determining the confidentiality level associated with content for presentation on a display of a computing device (502). In some examples, the confidentiality level is determined based one or more of: (i) metadata associated with the content and indicating the confidentiality level, (ii) a rule preconfigured by a provider of the content indicative of the confidentiality level for the content, (iii) a rule preconfigured by a recipient of the content indicative of the confidentiality level for content of a same type as a type of the content for presentation on the display, and (iv) an analysis of the content for presentation on the display and a determination based thereon of the confidentiality level.

Based at least in part on that confidentiality level, an unmask rule for unmasking the content on the display is determined (504). The unmask rule can include an unmasking parameter indicating an extent to which a masked version of the content on the display is to be physically shielded to unmask the content for viewing on the display.

Then, the masked version of the content is displayed on the display, which includes selecting and applying a mask to the content in displaying the content on the display (506). The mask may be selected based on the determined unmask rule to convey the unmasking parameter to a user. The mask may be selected from a plurality of possible masks to apply. Those masks may vary from each other by at least one visual mask characteristic, in which variance among the masks by the at least one visual mask characteristic indicates variance between the masks in the extent to which content being masked is to be physically shielded to unmask the content. Example visual mask characteristics by which the masks can vary include one or more of the following: shading, color, shape, pattern, size, or animation of the mask.

At some point a shielding level is detected (508), the shielding level indicating an extent to which the user has physically shielded the masked version of the content on the display. In some examples, a loop continually or periodically runs in the background and detects the shielding level. Additionally or alternatively, this detection may be triggered based on a triggering event, such as a time-based triggering event or on sensing touch input on the display.

In any case, it is determined whether the detected shielding level satisfies the unmasking parameter (510). If it is determined at 510 that the detected shielding level does not satisfy the unmasking parameter, the process loops by returning to 508 to detect, or await further detection of, a shielding level applied to the masked content.

If instead it is determined at 510 that the detected shielding level satisfies the unmasking parameter, then the content is unmasked on the display of the computing device (512) and the process ends.

In some examples, the unmasking of the content may be a temporary unmasking that incorporates a temporal component. In this case, the process of FIG. 5A, instead of ending after unmasking 512, may continue to the process of FIG. 5B. Thus, FIG. 5B may be triggered based on unmasking content. FIG. 5B depicts an example process in which unmasking of content is temporary, in which the mask is reapplied after some parameter is met. In the case of FIG. 5B, reapplication of the mask is performed based on either of the following being true: the shielding level applied to the content fails to satisfy the unmasking parameter, or an unmask time (time for which the mask is to be removed) elapses, regardless of whether the shielding level continues to satisfy the unmasking parameter. Referring the FIG. 5B, the process begins by repeating the detecting of the shielding level (514), this time while the content is unmasked. This shielding level indicates an extent to which the user has physically shielded the (now-unmasked) content on the display, which is also a reflection on the extent to which the user shields the masked version of the content, if the mask were applied.

Then, it is determined whether the detected shielding level satisfies the unmasking parameter (516). If not, i.e. based on determining that the detected shielding level no longer satisfies the unmasking parameter, the mask is reapplied to the content on the display (520) and the process ends. If instead at 516 it is determined that the shielding level satisfies the unmasking parameter, the process continues to 518 and determines whether the unmask time has elapsed. If not, this means that the physical shielding of the content continues to suffice, and the content has not been unmasked longer than the unmask time permits. Therefore, the process loops back to 514 to detect, or await further detection of, a shielding level applied to the unmasked content. If instead at 518 it is determined that the unmask time has elapsed, then the mask is reapplied to the content on the display (520), and the process ends.

Determination of the unmask rule may be further based on a current context in which the computing device is being used. The current context can include a current location of the computing device, a current time, a current day, or some combination involving one or more the foregoing. In some examples, the current context includes one or more environmental parameters of an environment in which the computing device is being used. These can one or more of: detected sound, detected nearby devices, detected ambient lighting around the computing device, or some combination involving one or more of the foregoing.

Additionally or alternatively, the current context can include physical proximity of the computing device to one or more individuals other than the user of the computing device. The physical proximity may be detected using one or more cameras of the computing device. The extent to which the masked version of the content on the display is to be physically shielded to unmask the content may be made (by way of the unmask parameter) directly proportional to one or more of the following: proximity of the computing device to individuals other than the user, or a number of individuals, other than the user, within eyesight of the masked version of the content on the display, as detected by the one or more cameras.

Determination of the unmask rule may be further based on metadata associated with the content, in which the metadata specifies a desired extent to which the masked version of the content is to be physically shielded to unmask the content for viewing. Additionally or alternatively, determination of the unmask rule may be further based on or one or more rules preconfigured by the user indicating a desired extent to which masked versions of content of a given type are to be physically shielded to unmask content of the given type for viewing.

In some embodiments, camera(s) of the computing device may detect one or more sight angles of one or more individuals, other than the user, within eyesight of the masked version of the content on the display, and detecting the shielding level may include detecting an extent to which the user has physically shielded the masked version of the content from viewing from the one or more sight angles. In this case, determining whether the detected shielding level satisfies the unmasking parameter can include determining that the masked version of the content is sufficiently shielded from viewing from the one or more sight angles.

Detecting the shielding level can include determining an area of the screen being hidden by the user, in which case determining whether the detected shielding level satisfies the unmasking parameter can include determining whether the area of the screen being hidden by the user satisfies the unmasking parameter. This determination of the area of the screen being hidden by the user can include ascertaining, based on one or more illumination levels indicated by one or more illumination detectors of the computing device, an extent to which external light is being blocked by the user.

Determining the area of the screen being hidden by the user may include determining a touch-area, on the display, being touched by the user, the touch-area including one or more touch points, and the touch-area determined by identifying and stitching together the touch points to identify the touch-area. An unmasking parameter of an unmask rule can include, reference, or indicate one or more predefined touch-area profiles, where determining whether the detected shielding level satisfies the unmasking parameter includes determining that the touch-area sufficiently matches a predefined touch-area profile of the one or more predefined touch-area profiles.

Processes described herein may be performed by one or more processing devices. In some examples, it is the mobile or other processing/computing device that the user is using and on which the content is displayed that performs process(es) described herein. In other examples, a remote processing device in communication with the processing device that the user uses performs process(es) described herein. As a third possibility, a combination of the (i) processing device and (ii) remote processing device perform process(es) described herein.

Figure 6:
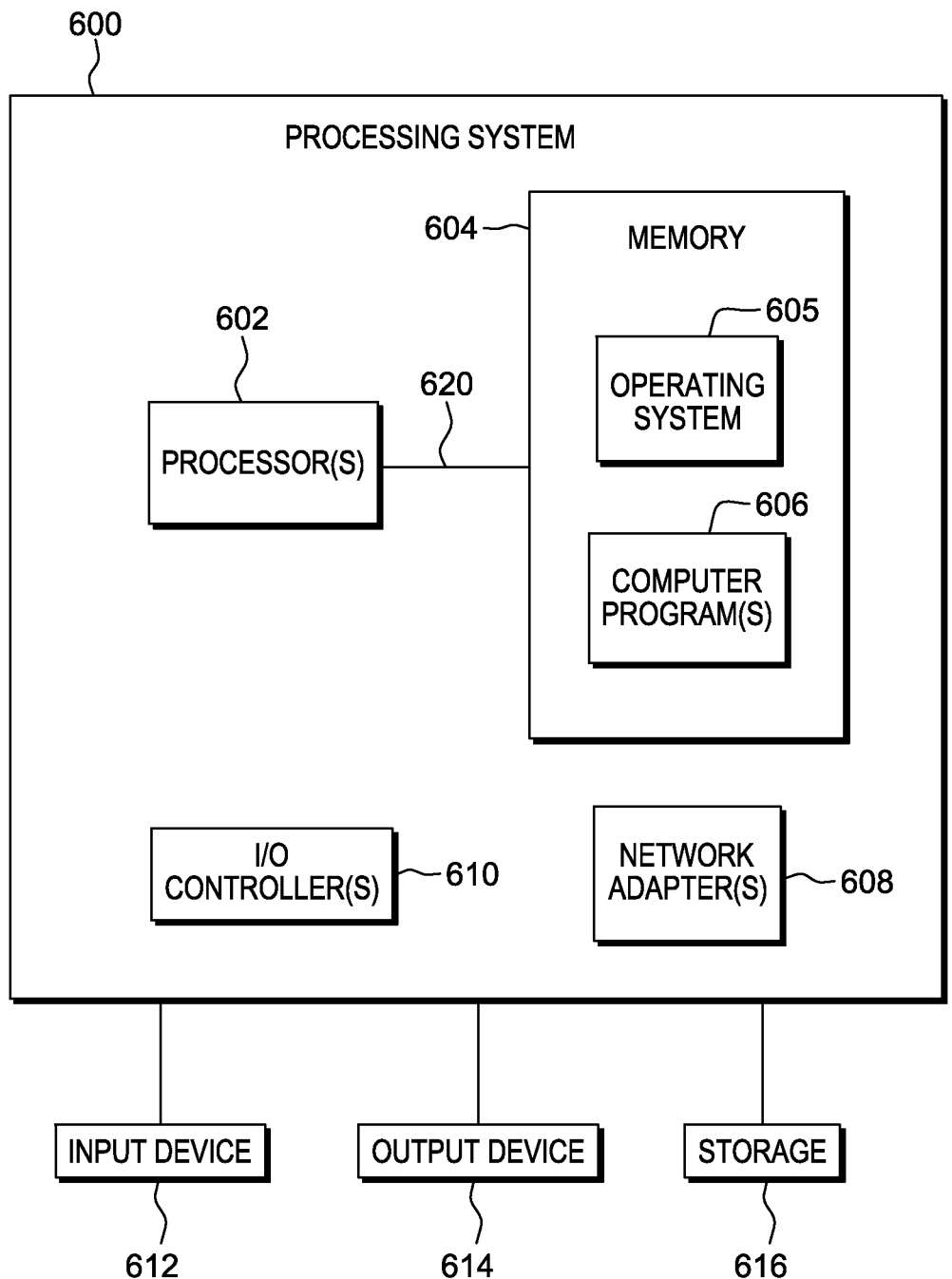
FIG. 6 depicts one example of a processing device to incorporate and use aspects described herein.

FIG. 6 depicts one example of a processing device to incorporate and use aspects described herein. A processing device may also be referred to herein as a computer device/system or computing device/system, or simply a computer. Processing device 600 may be based on, for instance, various system architectures such as those offered by International Business Machines Corporation (Armonk, N.Y., USA), Intel Corporation (Santa Clara, Calif., USA), or ARM Holdings plc (Cambridge, England, United Kingdom), as examples.

Processing device 600 is suitable for storing and/or executing program code and includes at least one processor 602 coupled directly or indirectly to memory 604 through, e.g., a system bus 620. In operation, processor(s) 602 obtain from memory 604 one or more instructions for execution by the processors. Memory 604 may include local memory employed during actual execution of the program code, bulk storage, and cache memories which provide temporary storage of at least some program code in order to reduce the number of times code must be retrieved from bulk storage during program code execution. A non-limiting list of examples of memory 604 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 604 includes an operating system 605 and one or more computer programs 606, for instance programs to perform aspects described herein.

Input/Output (I/O) devices 612, 614 (including but not limited to displays, such as touchscreen displays, microphones, speakers, accelerometers, gyroscopes, magnetometers, light sensors, proximity sensors, GPS devices, cameras, etc.) may be coupled to the system either directly or through I/O controllers 610.

Network adapters 608 may also be coupled to the system to enable the processing device to become coupled to other processing devices, storage devices, or the like through intervening private or public networks. Ethernet-based (such as Wi-Fi) interfaces and Bluetooth® adapters are just examples of the currently available types of network adapters 608 used in processing devices.

Processing device 600 may be coupled to storage 616 (e.g., a non-volatile storage area, such as magnetic disk drives, optical disk drives, a tape drive, etc.), having one or more databases. Storage 616 may include an internal storage device or an attached or network accessible storage. Computer programs in storage 616 may be loaded into memory 604 and executed by a processor 602 in a manner known in the art.

The processing device 600 may include fewer components than illustrated, additional components not illustrated herein, or some combination of the components illustrated and additional components. Processing device 600 may include any computing device known in the art, such as a mainframe, server, personal computer, workstation, laptop, handheld or mobile computer, tablet, wearable device, telephony device, network appliance, virtualization device, storage controller, etc.

Figure 7:
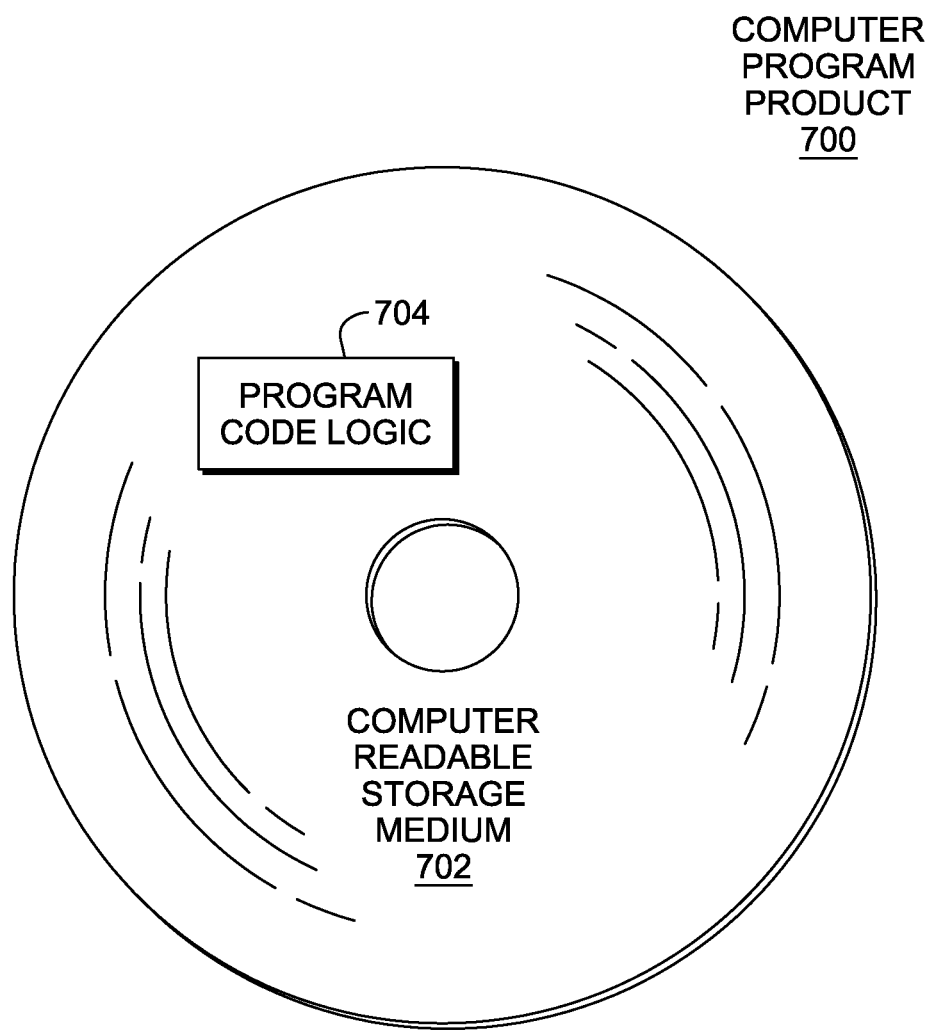
FIG. 7 depicts one embodiment of a computer program product.

Referring to FIG. 7, in one example, a computer program product 700 includes, for instance, one or more non-transitory computer readable storage media 702 to store computer readable program code means, logic and/or instructions 704 thereon to provide and facilitate one or more embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A method comprising:
determining an unmask rule for unmasking content on a display of a computing device, the unmask rule comprising an unmasking parameter indicating an extent to which a masked version of the content on the display is to be physically shielded to unmask the content for viewing on the display, and the determining the unmask rule being based at least in part on a confidentiality level associated with the content;
displaying the masked version of the content on the display, the displaying comprising selecting and applying a mask to the content in displaying the content on the display, wherein the mask is selected based on the determined unmask rule to include visual characteristics of the mask, the one or more visual characteristics conveying, to a user, the unmasking parameter including the indicated extent to which the masked version of the content is to be physically shielded by the user to unmask the content, wherein the mask is selected from a plurality of available masks that vary from each other by at least one visual mask characteristic, wherein each available mask of the plurality of available masks is associated with a respective extent to which content masked by the available mask is to be physically shielded to unmask the content, wherein variance among the plurality of available masks by the at least one visual mask characteristic visually indicates variance between the plurality of masks in their respective extents to which content being masked is to be physically shielded to unmask the content;
detecting, by a processor of the computing device, a shielding level indicating an extent to which the user has physically shielded the masked version of the content on the display;
determining whether the detected shielding level satisfies the unmasking parameter; and
temporarily unmasking the content on the display of the computing device based on determining that the shielding level satisfies the unmasking parameter.

2. The method of claim 1, wherein detecting the shielding level comprises determining an area of the screen being hidden by the user, and wherein determining whether the detected shielding level satisfies the unmasking parameter comprises determining whether the area of the screen being hidden by the user satisfies the unmasking parameter.

3. The method of claim 2, wherein determining the area of the screen being hidden by the user comprises ascertaining, based on one or more illumination levels indicated by one or more illumination detectors of the computing device, an extent to which external light is being blocked by the user.

4. The method of claim 2, wherein the unmasking parameter comprises one or more predefined touch-area profiles, wherein determining the area of the screen being hidden by the user comprises determining a touch-area, on the display, being touched by the user, the touch-area comprising a plurality of touch points at which the user touches the display, wherein determining the touch-area comprises identifying and stitching together the touch points to determine the touch-area, wherein determining whether the detected shielding level satisfies the unmasking parameter comprises determining that the touch-area sufficiently matches a predefined touch-area profile of the one or more predefined touch-area profiles.

5. The method of claim 1, further comprising detecting, using a camera of the computing device, one or more sight angles of one or more individuals, other than the user, within eyesight of the masked version of the content on the display, wherein detecting the shielding level comprises detecting an extent to which the user has physically shielded the masked version of the content from viewing from the one or more sight angles, and wherein determining whether the detected shielding level satisfies the unmasking parameter comprises determining that the masked version of the content is sufficiently shielded from viewing from the one or more sight angles.

6. The method of claim 1, wherein the at least one visual mask characteristic comprises one or more of the following: shading, color, shape, pattern, size, or animation of the mask.

7. The method of claim 1, wherein determining the unmask rule is further based on a current context in which the computing device is being used.

8. The method of claim 7, wherein the current context comprises one or more of: (i) a current location of the computing device, (ii) a current time, or (iii) a current day.

9. The method of claim 7, wherein the current context comprises one or more environmental parameters of an environment in which the computing device is being used, the one or more environmental parameters comprising one or more of: (i) detected sound, (ii) detected nearby devices, or (iii) detected ambient lighting around the computing device.

10. The method of claim 7, wherein the current context comprises physical proximity of the computing device to individuals other than the user of the computing device, the physical proximity detected using one or more cameras of the computing device, wherein the extent to which the masked version of the content on the display is to be physically shielded to unmask the content is directly proportional to one or more of the following: (i) proximity of the computing device to individuals other than the user, or (ii) a number of individuals, other than the user, within eyesight of the masked version of the content on the display, as detected by the one or more cameras.

11. The method of claim 1, wherein determining the unmask rule is based further on one or more of the following:
   metadata associated with the content, in which the metadata specifies a desired extent to which the masked version of the content is to be physically shielded to unmask the content for viewing; or
   one or more rules preconfigured by the user indicating a desired extent to which masked versions of content of a given type are to be physically shielded to unmask content of the given type for viewing.

12. The method of claim 1, further comprising:
   determining the confidentiality level associated with the content based on at least one of the following: (i) metadata associated with the content and indicating the confidentiality level, (ii) a rule preconfigured by a provider of the content indicative of the confidentiality level for the content, (iii) a rule preconfigured by a recipient of the content indicative of the confidentiality level for content of a same type as a type of the content for presentation on the display, or (iv) an analysis of the content for presentation on the display and a determination based thereon of the confidentiality level; and
   determining the unmask rule based on the determined confidentiality level.

13. The method of claim 1, further comprising, based on unmasking the content:
   repeating, while the content is unmasked, detecting the shielding level and determining whether the detected shielding level satisfies the unmasking parameter; and
   based on determining that the detected shielding level no longer satisfies the unmasking parameter, reapplying the mask to the content on the display.

14. A computer program product comprising:
   a computer readable storage medium readable by a processor and storing instructions for execution by the processor for performing a method comprising:
      determining an unmask rule for unmasking content on a display of a computing device, the unmask rule comprising an unmasking parameter indicating an extent to which a masked version of the content on the display is to be physically shielded to unmask the content for viewing on the display, and the determining the unmask rule being based at least in part on a confidentiality level associated with the content;
      displaying the masked version of the content on the display, the displaying comprising selecting and applying a mask to the content in displaying the content on the display, wherein the mask is selected based on the determined unmask rule to include one or more visual characteristics of the mask, the one or more visual characteristics conveying, to a user, the unmasking parameter including the indicated extent to which the masked version of the content is to be physically shielded by the user to unmask the content, wherein the mask is selected from a plurality of available masks that vary from each other by at least one visual mask characteristic, wherein each available mask of the plurality of available masks is associated with a respective extent to which content masked by the available mask is to be physically shielded to unmask the content, wherein variance among the plurality of available masks by the at least one visual mask characteristic visually indicates variance between the plurality of masks in their respective extents to which content being masked is to be physically shielded to unmask the content;
      detecting a shielding level indicating an extent to which the user has physically shielded the masked version of the content on the display;
      determining whether the detected shielding level satisfies the unmasking parameter; and
      temporarily unmasking the content on the display of the computing device based on determining that the shielding level satisfies the unmasking parameter.

15. The computer program product of claim 14, wherein the unmasking parameter comprises one or more predefined touch-area profiles, wherein detecting the shielding level comprises determining an area of the screen being hidden by the user, the determining the area of the screen being hidden by the user comprising determining a touch-area, on the display, being touched by the user, the touch-area comprising a plurality of touch points at which the user touches the display, wherein determining the touch-area comprises identifying and stitching together the touch points to determine the touch-area, wherein determining whether the detected shielding level satisfies the unmasking parameter comprises determining whether the area of the screen being hidden by the user satisfies the unmasking parameter and determining that the touch-area sufficiently matches a predefined touch-area profile of the one or more predefined touch-area profiles.

16. The computer program product of claim 14, wherein determining the unmask rule is further based on a current context in which the computing device is being used.

17. A computer system comprising:
   a memory; and
   a processor in communications with the memory, wherein the computer system is configured to perform a method, the method comprising:

determining an unmask rule for unmasking content on a display of a computing device, the unmask rule comprising an unmasking parameter indicating an extent to which a masked version of the content on the display is to be physically shielded to unmask the content for viewing on the display, and the determining the unmask rule being based at least in part on a confidentiality level associated with the content;

displaying the masked version of the content on the display, the displaying comprising selecting and applying a mask to the content in displaying the content on the display, wherein the mask is selected based on the determined unmask rule to include one or more visual characteristics of the mask, the one or more visual characteristics conveying, to a user, the unmasking parameter including the indicated extent to which the masked version of the content is to be physically shielded by the user to unmask the content, wherein the mask is selected from a plurality of available masks that vary from each other by at least one visual mask characteristic, wherein each available mask of the plurality of available masks is associated with a respective extent to which content masked by the available mask is to be physically shielded to unmask the content, wherein variance among the plurality of available masks by the at least one visual mask characteristic visually indicates variance between the plurality of masks in their respective extents to which content being masked is to be physically shielded to unmask the content;

detecting a shielding level indicating an extent to which the user has physically shielded the masked version of the content on the display;

determining whether the detected shielding level satisfies the unmasking parameter; and temporarily unmasking the content on the display of the computing device based on determining that the shielding level satisfies the unmasking parameter.

18. The computer system of claim 17, wherein the unmasking parameter comprises one or more predefined touch-area profiles, wherein detecting the shielding level comprises determining an area of the screen being hidden by the user, the determining the area of the screen being hidden by the user comprising determining a touch-area, on the display, being touched by the user, the touch-area comprising a plurality of touch points at which the user touches the display, wherein determining the touch-area comprises identifying and stitching together the touch points to determine the touch-area, wherein determining whether the detected shielding level satisfies the unmasking parameter comprises determining whether the area of the screen being hidden by the user satisfies the unmasking parameter and determining that the touch-area sufficiently matches a predefined touch-area profile of the one or more predefined touch-area profiles.

19. The computer system of claim 17, wherein determining the unmask rule is further based on a current context in which the computing device is being used.

* * * * *